JOSEPH F. WOESLEY & JULIUS F. WOESLEY.
FISHING APPARATUS.
APPLICATION FILED OCT. 5, 1908.
935,877.
Patented Oct. 5, 1909.
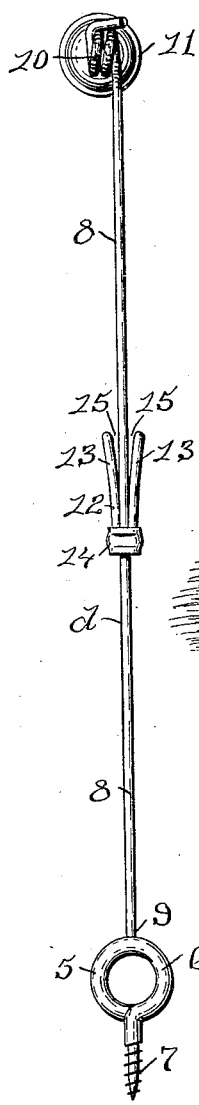
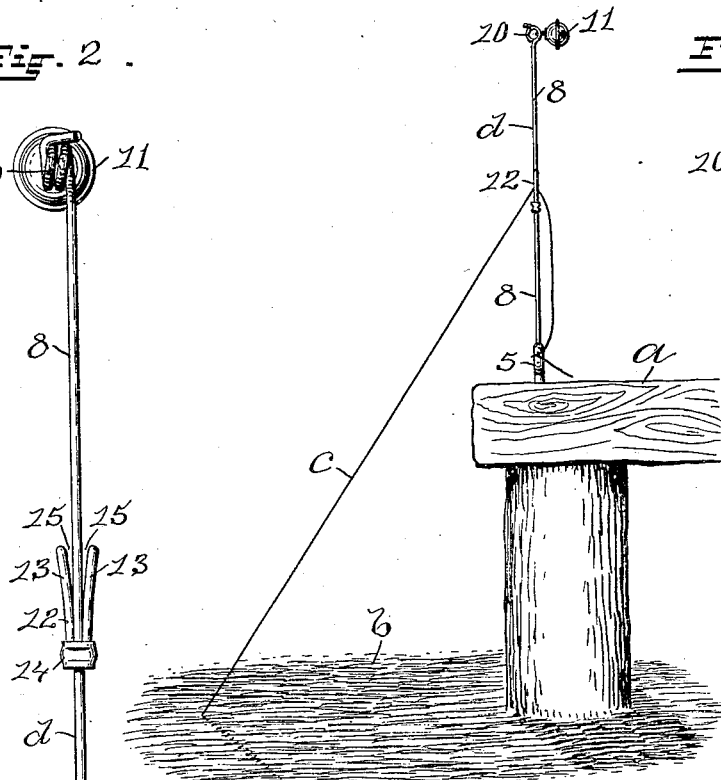
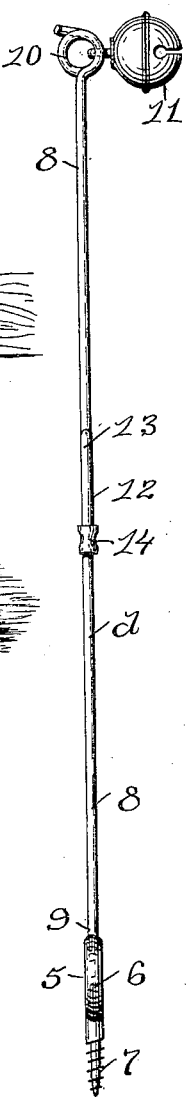
WITNESSES:
Chas. H. Luther
Ada E. Fagerty.
INVENTORS:
Joseph F. Woesley and
Julius F. Woesley
by Joseph A. Miller
ATTORNEY.

UNITED STATES PATENT OFFICE.

JOSEPH F. WOESLEY AND JULIUS F. WOESLEY, OF PROVIDENCE, RHODE ISLAND.

FISHING APPARATUS.

935,877.　　　　Specification of Letters Patent.　　Patented Oct. 5, 1909.

Application filed October 5, 1908.　Serial No. 456,230.

*To all whom it may concern:*

Be it known that we, JOSEPH F. WOESLEY and JULIUS F. WOESLEY, citizens of the United States, residing at Providence, in the county of Providence and State of Rhode Island, have invented a new and useful Improvement in Fishing Apparatus, of which the following is a specification.

This invention has reference to an improvement in fishing tackle and more particularly to an improvement in a fishing apparatus adapted to give an audible or visible signal through the bite or pull of a fish on the fish line in fishing.

The object of our invention is to improve the construction of a signal fishing apparatus, whereby through the use of the signal apparatus one or a plurality of lines may be used and the bite or pull of a fish on the lines automatically signaled to the fisherman by an audible or visible signal.

A further object of our invention is to simplify the construction of a signal fishing apparatus whereby the apparatus is easily and quickly detachably secured to a dock, wharf, quay, or the side of a boat, raft or other floating object used for fishing purposes.

Other objects of our invention are to construct a signal fishing apparatus in a compact form for packing or carrying purposes, to reduce the weight whereby a plurality of the signal fishing apparatus may be easily carried if desired, and to lessen the cost of manufacturing such signal fishing apparatus.

Our invention consists in the peculiar and novel construction of an automatic signal fishing apparatus having details of construction, as will be more fully set forth hereinafter and claimed.

Figure 1 is a vertical view, showing the end of a wharf extending over the water, one of our automatic signal fishing apparatus detachably secured to the wharf in a vertical position, and a fishing line extending from the signal apparatus down into the water, illustrating the adaptability and operation of the signal apparatus. Fig. 2 is a vertical front view of our improved signal fishing apparatus. Fig. 3 is a vertical side view of the signal fishing apparatus, and Fig. 4 is an upper end view of the signal fishing apparatus.

In the drawings, *a* indicates the outer end of a wharf extending over the water *b*, *c* a fish line, and *d* our improved signal fishing apparatus. The wharf *a*, water *b* and fish line *c* are shown to illustrate the use of our improved signal fishing apparatus *d* which consists of a screw eye having the regular eye end 6 merging into the usual screw threaded pointed end 7, a spring wire rod 8 secured at its lower end 9 to the top of the eye end 6 of the screw eye 5 and having a coiled upper end 10 to which a bell 11 or other audible or visible signal is secured, and a line fastening member 12 consisting of two short outwardly curved wires 13 13 secured at their lower ends centrally to the spring wire rod 8 by a clip 14 in a position to bring the curved wires at each side of the spring wire rod 8 and form two wedge-shaped spaces 15 15 intermediate the curved wires 13 13 and the spring wire rod 8, as shown in Fig. 2.

In the operation of our improved automatic signal fishing apparatus, the apparatus *d* is easily and quickly secured to the wharf *a* by simply screwing the screw eye 5 into the wharf in any position desired, preferably in a vertical position, as shown in Fig. 1. The hook on the line *c* is baited, cast into the water, and the end of the line *c* secured to the apparatus *d* by forcing the line into a wedge-shaped space 15 between the spring wire rod 8 and a curved wire 13. The end of the line may also be tied to the screw eye 5, as shown in Fig. 1. The pull on the line *c* caused by a fish biting will move or vibrate the spring wire rod 8, thereby giving an audible signal by the ringing of the bell 11 and a visible signal by the vibration of the bell and the upper end of the spring wire rod.

It is evident that a plurality of lines may be used by fastening a line in each of the spaces 15 15 in the fastening member 12 and by fastening a line to the coiled upper end 10 of the spring wire rod 8, also a plurality of the apparatus may be used in fishing in which case the bell 11 will give the audible signal and the vibration of the bell or flag will give the visible signal for the particular apparatus requiring attention, and any means may be used for detachably securing the apparatus to a wharf or boat without materially affecting the spirit of our invention.

Having thus described our invention, we claim as new and desire to secure by Letters Patent;—

In a signal fishing apparatus, the combination of a screw eye, a spring wire rod secured at its lower end to the screw eye and having a coiled upper end, a bell secured to the coiled upper end, and a line fastening member formed of two outwardly-curved wires, a clip in a position to bring the curved wires at each side of the spring wire rod and secure the curved wires in position to form wedge-shaped spaces, as described.

In testimony whereof we have signed our names to this specification in the presence of two subscribing witnesses.

JOSEPH F. WOESLEY.
JULIUS F. WOESLEY.

Witnesses:
ROBERT F. CARROLL,
EUGENE F. CARROLL.